UNITED STATES PATENT OFFICE.

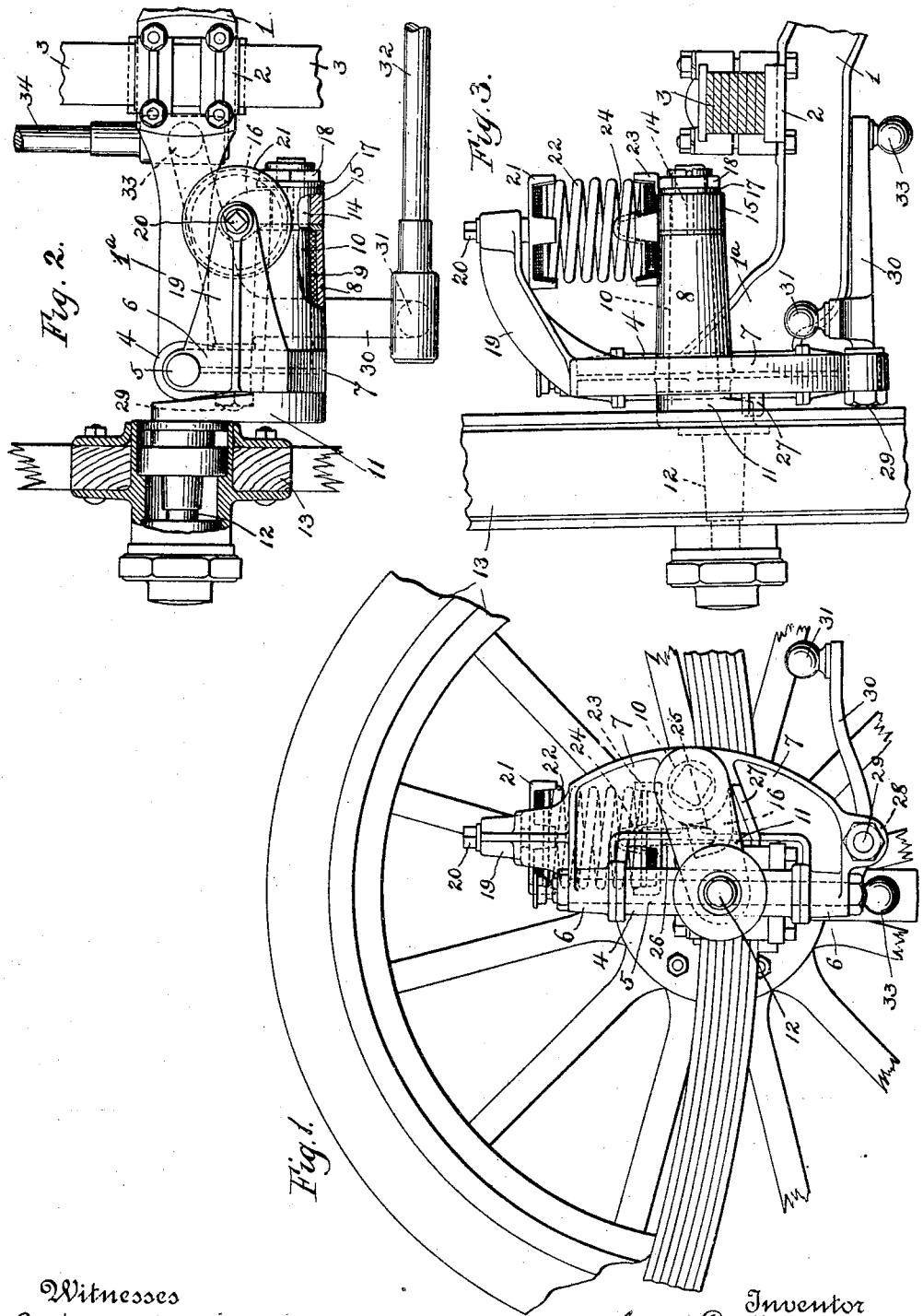

GEORGE D. MUNSING, OF NEWARK, NEW JERSEY.

WHEEL MOUNT AND AXLE.

966,577. Specification of Letters Patent. Patented Aug. 9, 1910.

Application filed June 7, 1909. Serial No. 500,486.

*To all whom it may concern:*

Be it known that I, GEORGE D. MUNSING, a citizen of the United States of America, residing at Newark, county of Essex, State of New Jersey, and whose post-office address is 45–47 Fourteenth street, Hoboken, county of Hudson, State of New Jersey, have invented certain new and useful Improvements in Wheel Mounts and Axles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to wheel mounts and axles for vehicles and has for its object to provide a compact and efficient cushioning or shock absorbing mechanism to permit of the individual vertical movement of wheels of vehicles more especially motor vehicles, and of the front wheels of automobiles that are moved with relation to the front axle, as will be particularly described in the following specification and pointed out in the claims.

Referring to the drawings in which like parts are similarly designated: Figure 1 is a side elevation. Fig. 2 is a plan view partly in section and Fig. 3 is a front elevation of my wheel mount.

I have illustrated my invention as applied to the front axle of an automobile, but I wish it understood that the rear wheels of a vehicle may be similarly mounted.

The front axle 1 of the motor vehicle or automobile is provided with a spring seat 2 and a spring 3 as is customary and the end of the axle is bent upwardly at 1ª and provided with a vertical sleeve 4. Passing through the vertical sleeve 4 which slightly inclines to the vertical to provide the rake for the wheel, is a pivot pin 5, said pivot pin also passing through arms 6 of the yoke 7 whereby said yoke is permitted to swing on or about the pin 5 as an axis. This yoke has a boss 8 provided with an anti-friction lining 9 and is of conical interior configuration in which is journaled one of the crank pins 10 of a double crank 11 on the other of whose crank pins 12 is mounted the vehicle wheel, in this particular instance the automobile wheel 13 and acts as the wheel spindle. The crank pin 10 is provided with a square end 14, Fig. 2, on which is carried a sleeve 15 that is provided with a projecting bracket or arm 16 and this sleeve is held in place by a washer 17 and a nut 18. From the upper portion of the yoke 7 projects a bracket 19 in which is mounted an adjusting screw 20 holding the spring cup 21 for the upper end of a spring 22 whose lower end is held in a similar cup 23, said cup 23 having a central depression or conical pocket 24. The bracket 16 also has a depression 25. A pin 26 is inserted between and is held in the depressions 24 and 25 and supports the lower spring cup 23 whereby said lower spring cup may have universal movement. The pin being loosely held in the depressions or recesses 24 and 25, is permitted to swing in any direction to a limited extent, the extent of said swing being limited by the conicity of the depression 24 in the lower spring cup.

On the side of the yoke 7 is formed a stop 27 in the path of the crank arm 11 whereby the downward movement of the wheel with respect to said yoke is limited. On the lower end of the yoke 7 is an eye 28 in which is secured by the bolt 29 a bell crank lever 30 having a connection 31 for the rod 32, Fig. 2, that connects the opposite similarly constructed wheel mount. The other arm of said bell crank lever being provided with a connection 33 for the steering rod 34, Fig. 2.

The operation is as follows: The normal position of the parts is as indicated in Fig. 1 and the crank arm 11 is held somewhat elevated from the stop 27. Upon striking a slight obstruction in the road the wheel will be raised independently of the other wheels thereby causing the crank 11 to swing about its crank pin 10 as a pivot and in doing so the shock will first compress the coil spring 22 and subsequently be taken up on the main spring 3 if it goes beyond the limit of the coil spring 22. On entering a depression the wheel will be compelled to follow the contour of the road by reason of spring 22 which will force down the bracket 16 and cause the crank 11 to rotate downward and move the wheel into the depression or to the limit of downward movement of the crank in contact with stop 27.

I claim:—

1. In a wheel mount the combination of an axle, a yoke pivoted thereon having a central boss, a crank having a pin journaled in the boss and a pin forming a wheel axle, an arm fixed on the journal pin extending in the direction of the crank, a spring-cup supported by and universally movable on said arm, a bracket extending from the top of the yoke over said cup, a cup depending from the bracket, a spiral spring seated in said cups, a lever fixed to the lower end of the yoke and a connecting rod pivoted to the lever adapted to be connected with a similar lever on the wheel mount at the other end of the axle.

2. In a wheel mount the combination of an axle, a yoke pivoted thereon having a central boss, a crank having a pin journaled in the boss and a pin forming a wheel axle, an arm fixed on the journal pin on the opposite side of the boss extending in the direction of the crank, a spring-cup supported by and universally movable on said arm, a bracket extending from the top of the yoke over said cup, a cup depending from the bracket, a spiral spring seated in said cups, a bell-crank lever fixed to the lower end of the yoke, a connecting rod hinged to one arm of the lever adapted to be connected to one arm of a similar lever on the other end of the axle, and a steering rod connected to the other arm of the bell crank lever.

In testimony that I claim the foregoing as my invention, I have signed my name in presence of two subscribing witnesses.

GEORGE D. MUNSING.

Witnesses:
GUSTAV A. SCHULENBERG,
HENRY ORTH, Jr.